(12) United States Patent
Vincenzi et al.

(10) Patent No.: US 7,976,818 B2
(45) Date of Patent: Jul. 12, 2011

(54) METHOD FOR RECOVERING TITANIUM TETRACHLORIDE FROM A WASTE LIQUID

(75) Inventors: Paolo Vincenzi, Ficarolo-Rovigo (IT); Rosa Spoto, Ferrara (IT); Matteo Badalocchi, Padua (IT)

(73) Assignee: Basell Poliolefine Italia s.r.l., Milan (IT)

( * ) Notice: Subject to any disclaimer, the term of this patent is extended or adjusted under 35 U.S.C. 154(b) by 367 days.

(21) Appl. No.: 11/791,564

(22) PCT Filed: Nov. 21, 2005

(86) PCT No.: PCT/EP2005/056115
§ 371 (c)(1),
(2), (4) Date: Jul. 2, 2007

(87) PCT Pub. No.: WO2006/056562
PCT Pub. Date: Jun. 1, 2006

(65) Prior Publication Data
US 2008/0069761 A1 Mar. 20, 2008

Related U.S. Application Data

(60) Provisional application No. 60/633,340, filed on Dec. 3, 2004.

(30) Foreign Application Priority Data

Nov. 25, 2004 (EP) .................................. 04106091

(51) Int. Cl.
*C01G 23/02* (2006.01)
(52) U.S. Cl. .............. 423/492; 423/69; 423/76; 203/29; 203/73; 203/80
(58) Field of Classification Search ................... 423/492
See application file for complete search history.

(56) References Cited

U.S. PATENT DOCUMENTS

| | | | | |
|---|---|---|---|---|
| 2,245,358 | A | * | 6/1941 | Pechukas ........................ 423/77 |
| 2,460,602 | A | * | 2/1949 | Semon ........................... 202/205 |
| 3,156,630 | A | | 11/1964 | Fahnoe et al. |
| 3,395,203 | A | | 7/1968 | Morita |
| 3,819,663 | A | | 6/1974 | Levine et al. |
| 5,242,549 | A | * | 9/1993 | Potter et al. .......................... 203/6 |
| 5,948,212 | A | * | 9/1999 | Kilty et al. ....................... 203/29 |
| 2005/0084433 | A1 | * | 4/2005 | Te Nijenhuis et al. ........... 423/69 |

FOREIGN PATENT DOCUMENTS

| | | |
|---|---|---|
| JP | 49 095896 | 9/1974 |
| WO | 03/074425 | 9/2003 |
| WO | WO03/074425 | * 12/2003 |

* cited by examiner

*Primary Examiner* — Melvin C Mayes
*Assistant Examiner* — Colette Nguyen
(74) *Attorney, Agent, or Firm* — Dilworth IP, LLC

(57) ABSTRACT

A method for continuously recovering titanium tetrachloride $TiCl_4$ from a waste liquid comprising $TiCl_4$ and by-products, wherein said waste liquid is subjected, as a flowing liquid film, to an evaporation step for a residence time of less than 15 minutes at a temperature higher than 90° C.

10 Claims, 1 Drawing Sheet

METHOD FOR RECOVERING TITANIUM TETRACHLORIDE FROM A WASTE LIQUID

This application is the U.S. national phase of International Application PCT/EP2005/056115, filed Nov. 21, 2005, claiming priority to European Patent Application 04106091.4 filed Nov. 25, 2004, and the benefit under 35 U.S.C. 119(e) of U.S. Provisional Application No. 60/633,340, filed Dec. 3, 2004; the disclosures of International Application PCT/EP2005/056115, European Patent Application 04106091.4 and U.S. Provisional Application No. 60/633,340, each as filed, are incorporated herein by reference.

The present invention relates to a method for recovering titanium tetrachloride $TiCl_4$ from a waste liquid generated during the manufacture of Ti-based catalysts for the olefin polymerization. In particular, said waste liquid comprises valuable $TiCl_4$ and further components, such as titanium haloalkoxides and conventional electron donors, and the present invention relates to a method for separating $TiCl_4$ from the further components contained in said waste liquid.

It is known that titanium tetrachloride is an important and valuable raw material in the industrial production of olefin polymerization catalysts, in particular of Ziegler-Natta catalysts, where the use of large amounts of liquid $TiCl_4$ is involved.

High activity Ziegler-Natta catalyst components are known to be obtained by contacting for a suitable time a liquid phase containing $TiCl_4$ with a solid support or catalyst precursor comprising a magnesium compound. For instance, solid particles of a support based on a magnesium dihalide, such as $MgCl_2$, or particles of precursors based on a magnesium haloalcoholate, such as ethoxymagnesiumchloride or diethoxymagnesium. A preferred type of solid precursor consists of adducts of $MgCl_2$ with aliphatic alcohols, such as ethanol, usually containing from 1 to 6 moles of alcohol, in the form of spherical particles. As the reaction with the $TiCl_4$, either pure or in hydrocarbon solution, is exothermic, the initial temperature of the liquid phase containing the $TiCl_4$ is kept to a temperature ranging from −10° C. to 50° C. Such a temperature is then gradually raised to a value to be kept in the range from 50° C. to 150° C. in order to ensure an effective titanation of the adduct particles. In the preparation of stereospecific catalyst components also electron donor compounds, usually chosen among esters of carboxylic acids or ethers, are fed to the titanation step.

The obtained solid catalytic component is then subjected to washes with a hydrocarbon solvent, in order to remove the unreacted $TiCl_4$. The hydrocarbon is preferably hexane, heptane or cyclohexane. As a result of the above described reactions and washes, the so obtained particles of catalyst component are discharged in form of slurry from the reaction vessel. Simultaneously a liquid stream comprising one or more solvents, the unreacted $TiCl_4$, chlorinated titanium alcoholates and other reaction by-products, for example those coming from the electron donor compound, is withdrawn from the reaction vessel and conveyed to a distillation section, aimed to recover both the titanium tetrachloride and the hydrocarbon solvents.

The distillation section can pursue only a partial and coarse recovery of the titanium tetrachloride. In fact, while the hydrocarbon solvents, mainly hexane, are the most volatile compounds and can be easily separated from the other components of the mixture in a distillation column, problems arise as regards the separation of $TiCl_4$ from alcoholates and other by-products. This separation can be only partially achieved by a distillation technique: from the top of the column a substantially pure $TiCl_4$ can be recovered and recycled to the titanation step. On the other hand, the liquid mixture withdrawn from the bottom of this distillation column still contains relevant amounts of unrecovered $TiCl_4$, despite the considerable difference existing between the boiling points of $TiCl_4$ and titanium alcoholates (about 50° C. at ambient pressure). Generally, as known to the person skilled in the art, a temperature at the bottom of the column close to the boiling point of the high-boiling components increases the separation efficiency of a distillation column. Therefore, higher values of the bottom temperature bring to a minimization of the $TiCl_4$ loss. Notwithstanding this technical consideration, it is not convenient to operate the bottom of the column at temperatures close to the boiling point of the high-boiling components (titanium alcoholates), but lower temperatures have to be maintained to avoid some drawbacks. Specifically, if the bottom temperature exceeds an upper limit, cracking and decomposition of some by-products may occur in the treated mixture: this implies a severe risk of having solid deposition on the internal walls with consequent fouling and clogging of the bottom part of the distillation column, the reboiler and the internals (trays, grids, packing) of the column itself.

Moreover, fouling and clogging problems are enhanced by the residence time of the liquid mixture inside the column. As known to the person skilled in the art, the liquid residence time is correlated to the column volume and generally this parameter cannot be lower than 30 minutes. In view of the above, the bottom temperature has to be maintained at a value well below the boiling point of the high-boiling components (about 180° C. at ambient temperature), so that a considerable amount of titanium tetrachloride is not separated, but is discharged from the bottom of the column together with alcoholates and other by-products. Generally, more than 50% of the bottom stream consists of titanium tetrachloride, so that the separation efficiency is very low.

It has to be underlined that the amounts of bottom stream are remarkable and the common process for treating the waste is based on a hydrolysis in a liquid phase and a successive neutralization step by means of NaOH to neutralize the HCl formed during the hydrolysis reaction.

This treatment involves the formation of large amounts of an aqueous slurry containing titanium hydroxide $Ti(OH)_4$ and organic compounds as by-products. Said aqueous slurry is sent to a filtration system for removing most of the liquid phase and thus obtaining a solid panel of relatively concentrated $Ti(OH)_4$ to be successively disposed. However, this method shows several drawbacks, the main ones can be summarized as follows:

A) Higher is the amount of waste liquid, higher is the amount of water required for the hydrolysis reaction. Generally, about 200 Kg of water are required for treating about 1 Kg of waste liquid. Therefore, after the hydrolysis reaction, large amounts of waste water with solid particles in suspension have to be treated in a deputation plant. Obviously, this depuration step considerably increases the overall costs of the process.

B) Higher is the amount of bottom column waste liquid, higher is the cost for the disposal of the obtained solid panel. In fact, the solid panel discharged from the filtration system has a low solid concentration, the $Ti(OH)_4$ concentration being generally lower than 20-25% by weight, while the remaining is $H_2O$. This makes the volumes to be disposed very demanding.

C) Large amounts of titanium tetrachloride are finally lost without any possibility of recovering such a valuable raw material.

For all the above reasons, it is widely felt the need of finding an innovative technique capable of recovering with an increased efficiency the titanium tetrachloride contained in the waste liquid coming from the titanation of solid catalyst components.

Figure 1:
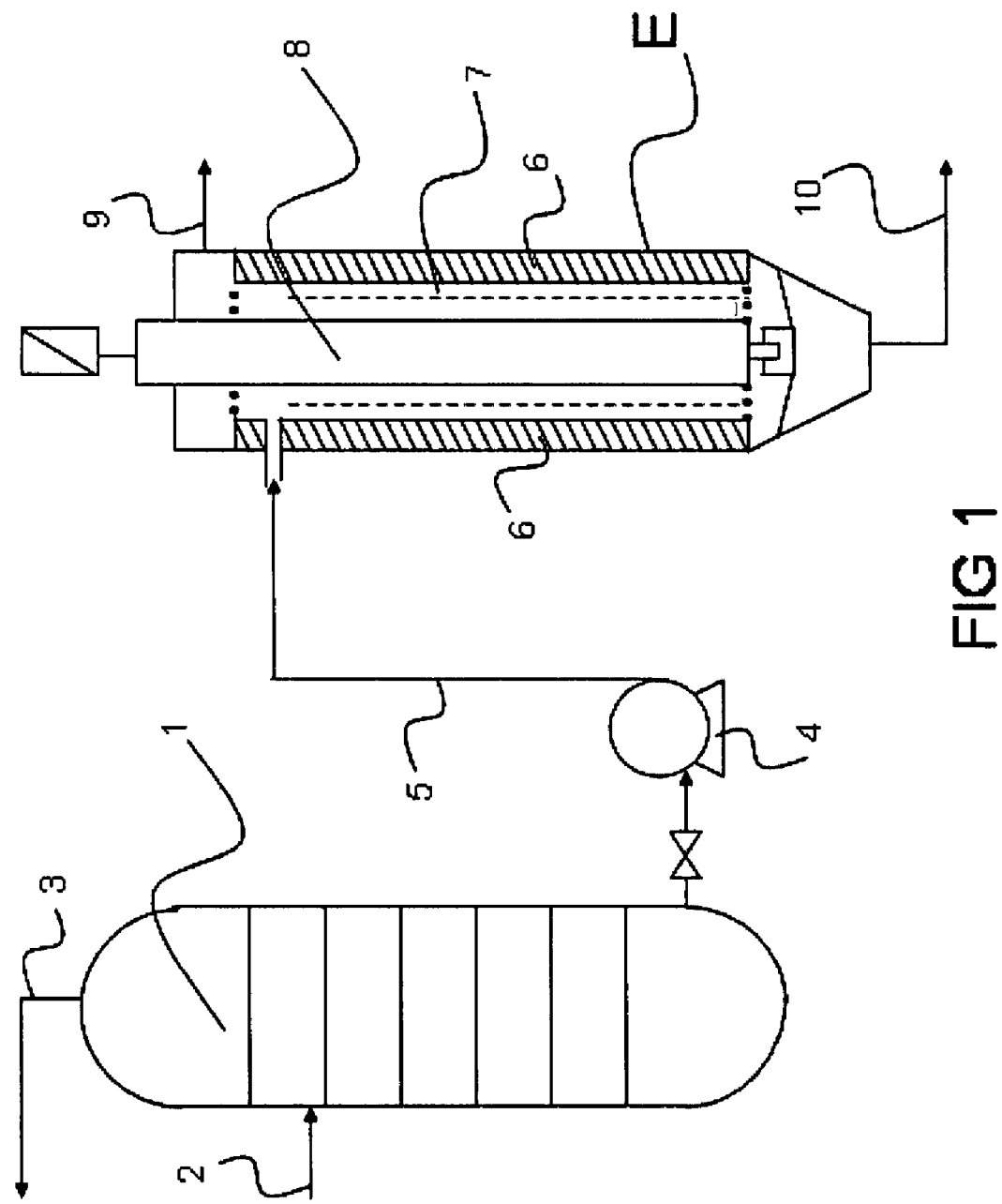
FIG. 1 is a process flow diagram illustrating the recovery of titanium tetrachloride from a waste liquid, where the waste liquid is subjected to a preliminary distillation step followed by an evaporation step.

The Applicant has now surprisingly found a method able of considerably increasing the amount of $TiCl_4$ separable from the above waste liquid and recyclable to the titanation step, simultaneously minimizing the amounts of waste product to be sent to disposal.

It is therefore an object of the present invention a method for continuously recovering titanium tetrachloride $TiCl_4$ from a waste liquid comprising $TiCl_4$ and by-products, the method being characterized in that said waste liquid is subjected, as a flowing liquid film, to an evaporation step for a residence time of less than 15 minutes at a temperature higher than 90° C.

The method of the present invention allows achieving an excellent separation of titanium tetrachloride from the reaction by-products generated during the manufacture of Ti-based catalysts for the olefin polymerization. In particular, the method according to the invention achieves the recovery of more than 97% by weight of the total $TiCl_4$ originally present in a waste liquid resulting from the titanation of solid catalytic components. Therefore, in comparison with the prior art techniques based on liquid-phase hydrolysis and successive neutralization, the loss of valuable $TiCl_4$ is greatly minimized, as well as the global costs connected with the neutralization and disposal of the waste liquid.

As explained in the background of the invention, the titanation of a catalyst support suitable for the olefin polymerization involves the discharge from the reaction vessel of a waste liquid comprising unreacted $TiCl_4$, one or more hydrocarbon solvents, titanium halo-alkoxides and other reaction by-products, such as conventional electron donors. This liquid is generally sent to a distillation column for recovering the hydrocarbon solvents, but only a limited amount of substantially pure $TiCl_4$ can be recovered from the top of the column. As a consequence, the bottom product of the distillation column is a waste liquid still containing relevant amounts of $TiCl_4$, which may be advantageously treated according to method of the present invention.

Therefore, the feeding to the evaporation step of the invention is a liquid comprising mostly $TiCl_4$ and titanium alcoholates, but also other by-products, for instance little percentages of solid or liquid organic compounds deriving from the electron donor compounds fed during the titanation step of the solid catalyst component. To sum up, the reaction by-products to be separated from $TiCl_4$ generally comprise:
  one or more titanium (halo) alkoxides of formula $TiX_p(OR)_q$, wherein X is halogen,
    R is a $C_1$-$C_{10}$ alkyl group, p=0-3, q=1-4, $2 \leq p+q \leq 4$;
    R is preferably selected from the group consisting of ethyl, n-propyl, isopropyl, n-butyl, isobutyl, tert-butyl, n-amyl, isoamyl, tert-amyl; X is preferably chlorine.
  optionally conventional electron donor compounds, such as aromatic and/or aliphatic (di)esters, (di)ethers, and their derivatives.

It must be pointed out that such a waste liquid containing the above components shows a high tendency to give solids deposition on the heating surfaces of a heat exchanger and this drawback has to be taken into consideration when looking for a technique capable of achieving a satisfying separation of the components contained in the mixture. The method of the invention overcomes said drawback by means of a film evaporation technique. Therefore, according to the invention the above waste liquid is subjected to evaporation in the form of a liquid film, being heated to favor the evaporation of $TiCl_4$, while the high-boiling by-products, such as titanium (halo) alkoxides, are not evaporated thus remaining in the liquid film.

The formation of a flowing liquid film with a thickness of some millimeters gives some important advantages. First, a liquid film of low thickness ensures a high heat transfer coefficient, so that the evaporation velocity of $TiCl_4$ is increased. Secondarily, the deposition of solid particles on the heating surfaces of the evaporator is hindered by the fact that said liquid film is continuously flowing. In general, these positive results are accomplished when the thickness of the liquid film is maintained at a value lower than 3 cm, preferably less than 1 cm.

Another important technical feature of the evaporation step of the invention is represented by the residence time inside the evaporation apparatus, which should be maintained at a value of less than 15 minutes, preferably of less than 5 minutes. The main effect of such low residence times is that cracking and decomposition of some by-products inside the liquid film during the evaporation of $TiCl_4$ is negligible. Differently from the conventional separation techniques carried out by distillation, wherein the high residence times of the liquid inside the distillation column, of about 60-90 minutes, require a limitation of temperature inside the bottom column, the recovery method of the invention can be carried out even at temperatures close to or higher than the boiling point of $TiCl_4$, without having cracking and decomposition of by-products: accordingly, the preferred range of temperatures adopted in the evaporation step of the invention is comprised between 100° C. and 150° C.

Generally, the above operative conditions allow to pursue a continuous evaporation of $TiCl_4$ from the liquid mixture flowing as a film. As a result of the present invention, a liquid film is obtained with a content of $TiCl_4$ strongly reduced: the $TiCl_4$/by-products weight ratio is brought to a value lower than 0.8, preferably lower than 0.5.

During the evaporation step $TiCl_4$ flashes away as a vapour stream, which can be condensed before the recycle to the titanation step. On the contrary, the high-boiling components, that is the titanium halo-alkoxides and the other by-products, are not evaporated, so that a liquid film enriched in said by-products is obtained.

According to a preferred embodiment of the present invention, the evaporation step can be carried out by means of a thin film evaporator.

A thin film evaporator consists of a cylindrical body comprising:
  a stator component, which is the external part of the evaporator, endowed with heating jackets. Steam or hot oil circulates inside these jackets, thus providing the heat of evaporation for the liquid film, which flows on the internal walls of the evaporator;
  a rotor component, which is the internal part of the evaporator, having the function of distributing the liquid mixture onto the internal walls of the evaporator, thus generating an uniform and thin liquid film, which flows downward by gravity.

The thin film evaporator is able to satisfy all the operative conditions of the method of the invention. In fact, the rotation of the rotor component uniformly distributes the liquid on the heating walls as a film, thus ensuring a high heat transfer coefficient. Moreover, the liquid film takes a short time to reach the opposite end of the internal wall of the evaporator, so that the low residence times are satisfied. The dynamic action of the rotor component is able to form a film of percolating liquid, even if the fluid is particularly viscous.

Substantially pure $TiCl_4$ flashes inside the thin film evaporator and can be recovered as a vapor stream from the top of this apparatus. Thereafter, this $TiCl_4$ stream can be condensed in an external condenser and then accumulated inside a tank before the recycle to the titanation vessel of solid catalytic components. High-boiling by-products fall downward as a liquid film along the internal walls and are withdrawn from the bottom part of the evaporator.

The method of the present invention can be applied to different process set-up. By way of example, a distillation step adopting particular operative conditions (preliminary distillation) may be provided upstream the method of the present invention.

According to this embodiment, the waste liquid comprising $TiCl_4$ and titanium (halo) alkoxides is subjected to a preliminary distillation operated under vacuum at a bottom temperature comprised between 90° C. and 115° C. The bottom stream coming from the distillation column is then subjected to the evaporation method of the present invention. The preliminary distillation is operated under vacuum: this choice is important because sub-atmospheric pressures allow to decrease the temperatures of the bottom part of the column, thus decreasing the probability of having cracking and decomposition of some by-products in the interior of the distillation column. Preferably the preliminary distillation is operated at pressures ranging from 0.1 bar to 0.8 bar, taking into account that, as known to the man skilled in the art, the values of pressure in a distillation column differ along its height and increase from the top to the bottom of the column.

The bottom temperature of the above distillation column has to be maintained at values comprised between 90° C. and 115° C., preferably between 95° C. and 110° C. The term "bottom temperature" indicates the temperature of the holdup of liquid filling up the bottom of the distillation column.

Generally, the above preliminary distillation achieves a first partial recover of titanium tetrachloride: in fact, with respect to the total $TiCl_4$ fed to the distillation column, at least 90% by weight of a substantially pure $TiCl_4$ is recovered from the top of the column. This amount can be stored for the successive use, or can be directly recycled to the reactor for the titanation of solid catalytic components.

As regards the bottom product of the preliminary distillation, it is substantially a waste liquid with a density of around 1.7 $Kg/dm^3$, but if cooled its viscosity quickly increases up to a complete solidification. Thus, differently from pure $TiCl_4$ which is a liquid at room temperature, said waste liquid is a compact solid if brought to room temperature.

The waste liquid coming from preliminary distillation still contains $TiCl_4$ in a considerable amount, in a range from 1.5 to 3.5, expressed as $TiCl_4$/by-products weight ratio. With the purpose of limiting the loss of such a valuable raw material, the above waste liquid can be successfully treated according to the method of the present invention.

The method of the present invention will now be described with reference to the enclosed drawing, which is illustrative and not limitative of the scope of the claimed method.

FIG. 1 is a diagrammatic representation of a preferred embodiment of the present invention, according to which the evaporation step of the invention is preceded by preliminary distillation, as above described.

As shown in FIG. 1, a waste liquid containing unreacted $TiCl_4$ and by-products, mainly titanium alcoholates, coming from the titanation of solid catalyst components is sent to a vacuum distillation column 1. The waste liquid is fed to the distillation column 1 via line 2. Pure $TiCl_4$ is recovered via line 3 from the top of the column and can be recycled to the titanation reactor (not shown).

A waste liquid comprising $TiCl_4$ and by-products is collected at the bottom of the vacuum column 1. Said waste liquid is continuously withdrawn from the bottom of column 1 by means of a pump 4 and then conveyed via line 5 to the top of a thin film evaporator E for the implementation of the method of the present invention.

The film evaporator E comprises an external housing provided with heating jackets 6 having the function of heating the liquid film 7 flowing downwards on the internal walls of the evaporator. Steam or hot oil, as a heating fluid, are circulated inside the heating jackets 6. A rotor 8, which rotates at a high speed in the internal part of the evaporator E, distributes uniformly the liquid as a thin film onto the internal walls of the evaporator.

$TiCl_4$ continuously evaporates from the liquid film 7 and is recovered as a vapor stream from the top of the evaporator E via line 9. The liquid film enriched in titanium halo-alkoxides and other by-products percolates along the internal walls of the evaporator E and is discharged from the bottom of the evaporator via line 10.

The following examples will further illustrate the present invention without limiting its scope.

EXAMPLE 1

A waste liquid coming from a process to make a Ziegler-Natta Ti-based catalyst for the polypropylene production is subjected to the method of the present invention, carried out by means of the process setup shown in FIG. 1.

The waste liquid comprises $TiCl_4$ as the valuable component to be recovered, and Ti-chloroalkoxide compounds, di-isobutyl-phthalate (DIBP) as the main by-products (97% by wt of $TiCl_4$ and 3% by wt of by-products).

10000 Kg/h of the above waste liquid are fed to preliminary distillation in a column operating at vacuum conditions: about 0.2 bar at the top of the column, about 0.8 bar at the bottom of the column. The internals of the column are provided with packed material: Gempak 2A model with a grating EF-25A model for the upper stages and a grating EF-25A model for the lower stages.

The temperature at the top of the column is maintained at about 80° C., while the bottom temperature is maintained at about 97° C. The residence time of the liquid inside the bottom of the column is of about 90 minutes.

9000 Kg/h of a substantially pure $TiCl_4$ are obtained from the top of the vacuum column, while 1000 Kg/h of a waste liquid comprising $TiCl_4$ and by-products are withdrawn from the bottom of the distillation column.

The discharged waste liquid has a weight ratio $TiCl_4$/by-products of 2.2 and is fed by a pump to the top of a film evaporator E as shown in FIG. 1.

A rotation velocity of the rotor of 250 rpm ensures a distribution of the liquid as a film on the heating walls. The thickness of the film is measured giving a value of around 3 mm.

Hot oil is continuously circulated inside the heating jackets of the evaporator to keep the temperature of the internal walls of the evaporator at 120° C.

680 Kg/h of pure $TiCl_4$ are obtained from the top of the film evaporator, while 320 Kg/h of liquid film are discharged from the bottom.

In spite of the short residence time of the liquid inside the evaporator, only 20 seconds, a considerable fraction of TiCl$_4$ is separated by evaporation from the liquid film: as a result, the liquid film discharged from the bottom of the evaporator has a weight ratio TiCl$_4$/by-products reduced to a value of only 0.024.

EXAMPLE 2

The waste liquid as defined in example 1 was subjected to preliminary distillation according to the same operative conditions given in example 1.

9000 Kg/h of a substantially pure TiCl$_4$ are obtained from the top of the vacuum column, while 1000 Kg/h of a waste liquid comprising TiCl$_4$ and by-products are withdrawn from the bottom of the distillation column.

The discharged waste liquid has a weight ratio TiCl$_4$/by-products of 2.2 and is fed by a pump to the top of a film evaporator E as shown in FIG. 1.

A rotation velocity of the rotor of 250 rpm ensures a distribution of the liquid as a film on the heating walls. The thickness of the film is measured giving a value of around 3 mm.

Hot oil is continuously circulated inside the heating jackets of the evaporator to keep the temperature of the internal walls of the evaporator at 105° C.

660 Kg/h of pure TiCl$_4$ are obtained from the top of the film evaporator, while 340 Kg/h of liquid film are discharged from the bottom.

In spite of the short residence time of the liquid inside the evaporator, only 20 seconds, a considerable fraction of TiCl$_4$ is separated by evaporation from the liquid film: as a result, the liquid film discharged from the bottom of the evaporator has a weight ratio TiCl$_4$/by-products reduced to a value of only 0.088.

The invention claimed is:

1. A method for continuously recovering titanium tetrachloride TiCl$_4$ from a waste liquid comprising TiCl$_4$ and by-products, the method comprising subjecting a flowing waste liquid film to an evaporation step comprising a residence time of less than 15 minutes at a temperature from higher than 90° C. to 150° C., without cracking and decomposition of the by-products.

2. The method according to claim 1, wherein said by-products comprise:
   at least one titanium (halo) alkoxide of formula TiX$_p$(OR)$_q$, wherein X is halogen, R is a C$_1$-C$_{10}$ alkyl group, p=0-3, q=1-4, and 2<p+q<4; and
   optionally electron donor compounds and their derivatives.

3. The method according to claim 1, wherein said liquid film has a thickness lower than 3 cm.

4. The method according to claim 1, wherein said residence time is less than 5 minutes.

5. The method according to claim 1, wherein the temperature in said evaporation step is comprised between 100 and 150° C.

6. The method according to claim 1, wherein during said evaporation step TiCl$_4$ flashes away as a vapour stream.

7. The method according to claim 1, wherein said evaporation step is carried out by means of a thin film evaporator.

8. The method according to claim 7, wherein said thin film evaporator comprises internal walls, a stator comprising heating jackets, and a rotor distributing the liquid as a film onto the internal walls of the evaporator.

9. The method according to claim 1, further comprising subjecting said waste liquid comprising TiCl$_4$ and by-products to a preliminary distillation in a column operated under vacuum at a bottom temperature comprised between 90° C. and 115° C.

10. The method according to claim 9, wherein said preliminary distillation is carried out at pressures ranging from 0.1 bar to 0.8 bar.

* * * * *